United States Patent [19]

Bendell et al.

[11] 3,767,853

[45] Oct. 23, 1973

[54] AUTOMATIC IRIS CONTROL

[76] Inventors: Sidney Leo Bendell, Riverton; Cydney Ashley Johnson, Marlton, both of N.J.

[22] Filed: Sept. 21, 1972

[21] Appl. No.: 290,802

[52] U.S. Cl. .......................... 178/7.2, 178/DIG. 29
[51] Int. Cl. .......................................... H04n 5/34
[58] Field of Search ...................... 350/17; 178/7.2, 178/7.92, DIG. 29; 352/141; 250/229

[56] References Cited

UNITED STATES PATENTS

| | | | |
|---|---|---|---|
| 3,377,427 | 4/1968 | Fischer | 178/DIG. 29 |
| 3,652,154 | 3/1972 | Gebel | 178/DIG. 29 |
| 3,691,302 | 9/1972 | Gaebele et al. | 178/DIG. 29 |
| 3,711,644 | 1/1973 | Ishiguro | 178/DIG. 29 |

*Primary Examiner*—Robert L. Richardson
*Attorney*—Eugene M. Whitacre et al.

[57] ABSTRACT

An automatic iris control for use in a television camera. The apparatus is responsive to changes in scene illumination and prevents iris change in response to capping the lens. A memory system is employed to retain the iris control voltage prior to lens cap operation and maintain that voltage until the lens cap is removed. Delay circuitry insures inactivation of automatic iris control until the lens cap is completely withdrawn.

8 Claims, 2 Drawing Figures

AUTOMATIC IRIS CONTROL

Figure 1:
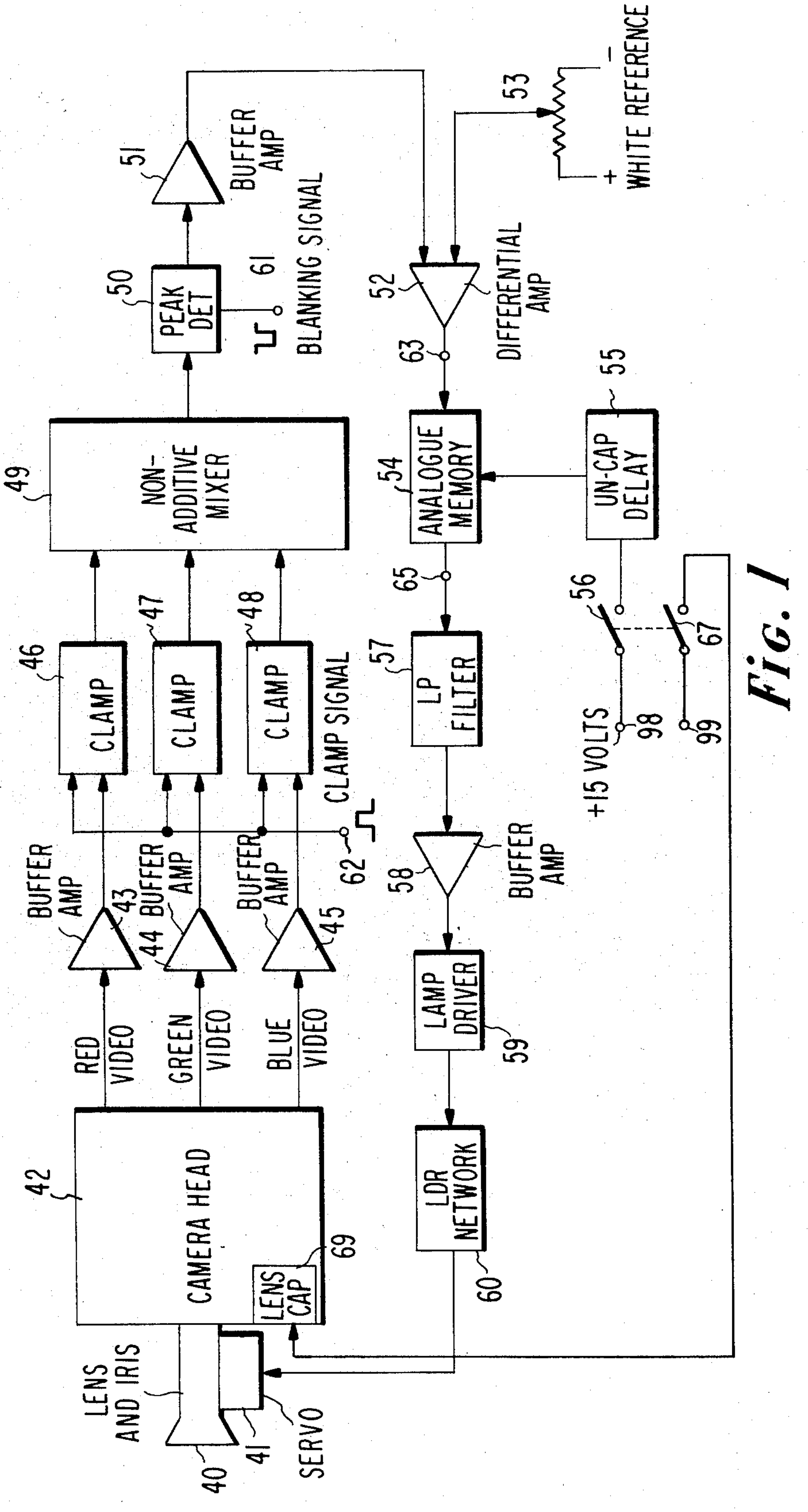

This invention relates to television cameras, and more particularly to means for automatically controlling the amount of scene illumination incident on the image pickup device of the camera.

Television cameras require a particular range of illumination levels incident on the image pickup device in order to provide video signals commensurate with a maximum contrast ratio of the illuminated scene. When illumination at the image pickup device has been properly adjusted the television camera will also provide maximum resolution, proper gray scale rendition and in the case of a color television camera, maximum accuracy of color reproduction. Such a system to continuously provide the proper amount of light at an image pickup device may comprise an automatically adjustable iris situated in the light path to the image pickup device and arranged in a servo loop to respond to electrical signals from the image pickup device proportional to the amount of illumination.

During standby operation of a television camera, the lens is often capped to protect the image pickup device. The lens capping is typically effected by a mechanical device which may be electrically positioned in or out of the light path to the image pickup device. Activation of a lens cap switch causes a vane, shutter, or similar acting device to be placed in the optical path of the image pickup device. Deactivation of the lens cap switch, for example, causes the vane to be withdrawn allowing light to reach the image pickup device for normal television camera operation. If the television camera is equipped with an automatically adjustable iris, and if the lens is capped the iris control apparatus may respond to the absence of light and automatically adjust the iris to an undesirably large opening. Under such conditions, removal of the lens cap may expose the image pickup device to undesirably large amounts of illumination, preventing instantaneous use of the television camera and subjecting the image pickup device to possible damage.

A television camera embodying the invention, includes a control system having means for detecting incident light thereon through an adjustable light transmission means such as an iris, to derive a control voltage. The control voltage is applied to a signal storage or memory device which in turn controls means for adjusting the light transmission means. The camera also includes a selectively operable means which may be in the form of a lens capping system to inhibit or permit the passage of light to the light detecting means. When the selectively operable means is operated in a first condition to inhibit light from reaching the light detecting means, a circuit is actuated to decouple the light detecting means from the signal storage device so that the setting of the adjustable light transmission means is not substantially changed by operating in this first condition.

Figure 2:
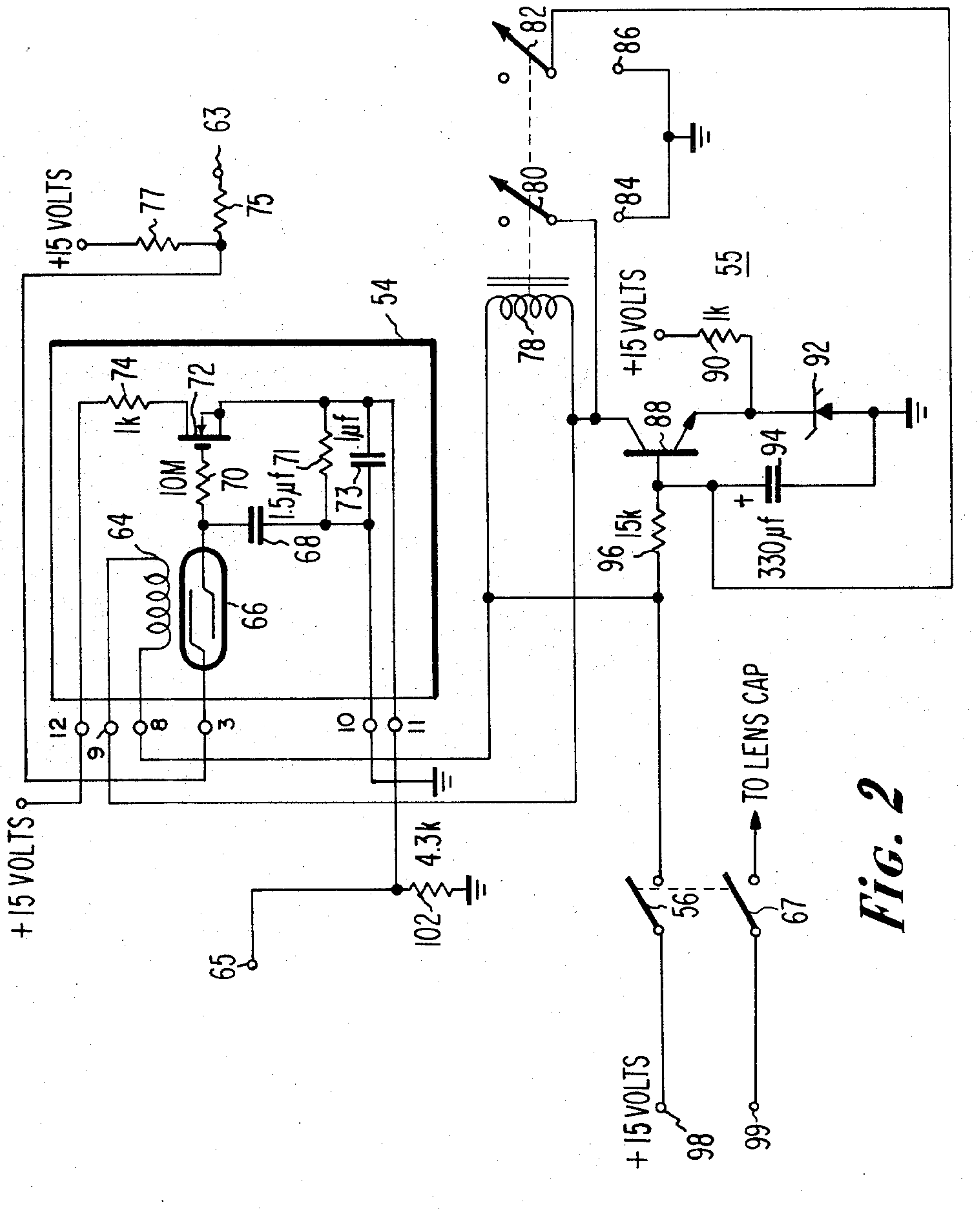

A preferred embodiment of the invention is described in the detailed description that follows and in the accompanying drawings of which:

FIG. 1 is a block diagram of an automatically adjustable iris control in accordance with the present invention; and FIG. 2 is a detailed schematic drawing of the analogue memory and the un-cap delay circuits in accordance with the present invention and the block diagram in FIG. 1.

DESCRIPTION OF THE INVENTION

In FIG. 1 light from an illuminated scene enters the lens and iris combination 40 of a television camera, and is converted to electrical signals in camera head 42. Camera head 42, comprises at least one image pickup device and associated circuitry for processing and providing video signals representative of the red, green and blue color components of the illuminated scene.

The red, green and blue color representative video signals from camera head 42 are coupled to buffer amplifiers 43, 44 and 45, respectively, wherein each signal is amplified. Clamping stages 46, 47 and 48 d.c. restore signals from their respective buffer amplifiers 43, 44, 45 to a reference d.c. level. This reference level clamping signal is applied to terminal 62 periodically and coincident with the horizontal blanking interval. Signals derived from clamping stages 46, 47 and 48 are coupled to the input circuitry of non-additive mixer 49. Non-additive mixer 49 continuously selects the input signal of greatest amplitude and couples it to its output terminal. Peak detector 50 is coupled to non-additive mixer 49 and provides outputs signals corresponding to the amplitude of successive signal peaks applied to its input. Additional circuitry, not shown, associated with peak detector 50 and terminal 61 provide means by which a blanking signal may be inserted to blank the undesired video occuring during the blanking interval.

Buffer amplifier 51 translates the relatively high output impedance of peak detector 50 to a relatively low impedance and also provides current gain to the peak detected signals. The output of buffer amplifier 51 is coupled to a first input terminal of differential amplifier 52. A second input terminal of differential amplifier 52 is coupled to potentiometer 53 which supplies a reference d.c. voltage. Adjustment of potentiometer 53 shifts the output d.c. level of differential amplifier 52 thereby providing means to manually set the iris control voltage to adjust the iris 40 relative to scene illumination. Potentiometer 53 may also be used as a vernier adjustment allowing the operator to subjectively adjust the iris with respect to a scene observed on a television monitor. Differential amplifier 52 has a gain of approximately three and provides analogue output signals about a reference d.c. level in response to the peak detected signals coupled to its first input terminal and the reference d.c. level coupled to its second input terminal.

Signals derived from differential amplifier 52 are coupled through terminal 63 to an analogue memory 54, wherein storage of this signal information is provided. Analogue memory 54 utilizes a capacitor for the signal storage medium and a field effect transistor for coupling signals therefrom. A more detailed description of memory 54 follows in the explanation of FIG. 2. Output signals from the analogue memory 54 are representative of the mathematical integral of input signals supplied during the periods when the lens capping system is in the uncapped or normal camera operating mode, the relatively large storage capacitance of memory 54 serving to integrate the signals applied thereto.

Activation of the lens capping system to cap the lens causes contacts 67 and 56 to open. When contacts 67 open, the voltage applied at terminal 99 is inhibited from lens cap 69 causing it to assume a position in the optical path of camera head 42 and thereby preventing scene illumination from reaching the image pickup device. Concurrently, when contacts 56 are opened the fifteen volts appearing at terminal 98 is inhibited from reaching circuitry in un-cap delay 55 in turn preventing further signal information from entering memory 54. When signal information is inhibited, memory 54 maintains an output level equal in value to that just prior to the opening of contacts 56.

Deactivation of the lens capping system by closing contacts 67 and 56 withdraws the lens cap 69 from the optical path in camera head 42 allowing scene illumination to pass to the image pickup device and activating un-cap delay circuit 55. The un-cap delay circuit provides a delay of one to two tenths of a second, delaying the signal information from entering memory 54 for this period. This delay is necessary in order to insure that the lens cap is completely withdrawn from its position preventing light from entering the camera, prior to allowing the analogue memory 54 to be supplied with signal information from differential amplifier 52. Refer to the subsequent description of FIG. 2 for more details on this circuit.

Signals from the analogue memory 54 are coupled through terminal 65 to a low-pass filter 57 which is of a type providing a first response time for signals corresponding to changes in scene illumination from dark to bright and a second response time for signals corresponding to changes in scene illumination from bright to dark. In such a dual time constant scheme a relatively short time constant is provided for scenes tending towards increasing brightness, while a relatively long time constant is provided for scenes tending towards darkness. The short time constant allows a rapid iris response to scenes of increased brightness, preventing saturation of the image detector. Scenes tending towards darkness have the more subjectively desirable slow iris response time.

Signals provided from low-pass filter 57 are coupled to buffer amplifier 58 and from there to lamp driver 59. Lamp driver 59 comprises circuitry including inverting and non-inverting amplifiers commonly coupled at their inputs and each driving a set of lamps. These lamps operate in a differential manner such that when one set of lamps is on a maximum amount the other set is off and vice-versa.

Light dependent resistor network 60 comprises a series-coupled pair of LDR's each driven by a differentially operative set of lamps of lamp driver 59. The series combination of the LDR's when light driven differentially form a three terminal network analogous in operation to a potentiometer. This desirable combination provides means to control a servo 41 which may include a servo amplifier driving apparatus for adjusting the iris opening.

Television camera lenses equipped with electrically operable irises typically provide two or three wires to be connected to an iris adjust potentiometer in the television camera. Adjustment of the iris adjust potentiometer then produces a corresponding iris change in the lens. Utilization of LDR's as a replacement for the iris adjust potentiometer provides means by which a lens equipped with such an electrically adjustable iris may be utilized in the automatic iris system described herein without modification of the servo 41 supplied with the lens.

FIG. 2 is a schematic drawing of analogue memory 54 and un-cap delay circuit 55. These circuits, 54, 55 operate in conjunction to provide means of storage and control of information supplied to memory 54.

Signals from the output terminal 63 of differential amplifier 52 are coupled through resistor 75 and contacts 66 to a memory capacitor 68. A resistor 77 is coupled between a +15 volt supply and the junction of resistor 75 and contact 66 providing a source of bias voltage for the transistor 72. The series configuration of resistor 75 and capacitor 68 effectively integrates signals applied thereto and present these integrated values as the voltage across capacitor 68. When relay contacts 66 are opened, the condition existing when the camera lens is capped, an open circuit is created between capacitor 68 and differential amplifier 52 preventing further signal information from affecting a change in the voltage across capacitor 68 and allowing it to retain that voltage. The stored voltage across capacitor 68 corresponds to the memorized control signal utilized during the period of time when the lens is capped.

A resistor 70 is coupled between capacitor 68 and the gate electrode of field effect transistor (FET) 72 providing means through which stored energy in capacitor 68 is coupled to FET 72. The inherently high impedance of a gate electrode associated with FET 72 minimizes the discharge of capacitor 68 during the period of time when delay contacts 66 are open and thereby allows a substantially constant level of conductivity in the device over relatively long periods of time.

Field effect transistor 72 has its drain electrode coupled to a source of supply voltage through a resistor 74 and its source and substrate electrodes coupled in common to an output terminal 65 and a resistor 102 across which output voltages are produced corresponding to voltages appearing across capacitor 68. A resistor 71 and a capacitor 73 are connected in parallel between the source and substrate electrodes to ground.

During standby operation the television camera lens is capped, activating circuitry to open contacts 56. As a result, current is inhibited from flowing into relay coil 64, causing contacts 66 to open and thereby preventing further signal information from changing the output level memory 54. The last stored information in memory 54 then corresponds to the scene illumination and lens setting prior to capping. This setting is maintained until the lens cap is removed.

In order to prevent inadvertent iris change during the period of time when the lens cap is being removed, a delay circuit simulating the time to remove the lens cap, approximately one to two tenths of a second, is provided. This delay circuit comprises an RC timing network formed by the series combination of a resistor 96 and a capacitor 94. A transistor 88 has its base electrode coupled to capacitor 94. Transistor 88 causes current flow in relay coils 64 and 78 when the voltage across capacitor 94 reaches a threshold level which causes the transistor to conduct. A resistor 90 is series coupled from the 15 volt supply to zener diode 94 producing a reference voltage of 3.3 volts at the resistor-diode (90,94) junction. This voltage is coupled to the emitter electrode of transistor 88 providing a transistor threshold bias level. Hence, when the base electrode of transistor 88 reaches a value of approximately 0.7 volts above its emitter voltage, current flows in its collector circuit energizing relay coils 64 and 78.

Deactivation of the lens capping circuitry, uncapping the lens, closes contacts 56 and applies 15 volts to the un-cap delay circuitry. Capacitor 94 slowly charges (approximately 0.2 seconds) through resistor 96 until it reaches a level of approximately 4.0 volts.

Upon reaching this level, transistor 88 begins conducting current through its collector electrode and in so doing, energizes relay coil 78, closing contacts 80 onto 84 and 82 onto 86. Upon the closure of contacts 80 onto 84, current flow through relay coils 78 and 64 bypasses transistor 88 and flows through these contacts to ground. This provides relay coils 78 and 64 with the full supply voltage (15 volts) across them and eliminates the power dissipation of transistor 88. Closure of contacts 82 onto 86 couples capacitor 94 to ground discharging it in preparation for reactivation of the un-cap delay circuit.

The invention as described above provides a means for retaining the iris setting just prior to lens capping and memorizing that setting until the lens is once again uncapped. Additional circuitry is incorporated to insure that automatic iris operation doesn't occur until the lens cap is completely withdrawn. Thus, this circuitry in combination with the automatic iris control voltage producing circuitry comprises an improved automatic iris control system.

What is claimed is:

1. In a television camera, a system for automatically adjusting an iris disposed in the optical path of said camera, comprising:

means for detecting light from an illuminated scene and converting said light into electrical signals;

lens capping means;

means selectively operative in a first condition for disposing said lens capping means in the optical path of said detecting means for inhibiting scene light in said optical path, and operative in a second condition for disposing said lens capping means out of said optical path of said detecting means allowing scene illumination to pass thereto;

an adjustable iris means disposed in the light path of said detecting means;

peak detecting means coupled to said light detecting means;

memory means coupled to said peak detecting means, said memory means providing a control signal corresponding to the integral of the output signal of said peak detecting means;

means for decoupling said memory means from said peak detecting means when said lens capping means inhibits scene light from said detecting means;

delaying means for retarding coupling of said memory means to said peak detecting means for a predetermined interval after said lens capping means is operated to allow light to arrive at said detecting means;

variable resistance means coupled to said memory means, said memory means controlling the resistance of said variable resistance means; and servo means coupled to said iris and to said variable resistance means for controlling the aperture of said iris in response to changes in said variable resistance whereby said iris aperture is adjusted corresponding to changes in scene illumination.

2. In a television camera, a system for automatically adjusting an iris according to claim 1, wherein:

said memory means comprises a capacitor and a field effect transistor having a gate electrode coupled to said capacitor, a drain electrode coupled to a source of supply voltage and a source electrode coupled to said variable resistance means; and said decoupling means includes relay contacts coupled to said peak detecting means and to said capacitor.

3. In a television camera, a system for automatically adjusting an iris according to claim 1, wherein:

said decoupling means includes relay circuitry for decoupling said memory means from said peak detecting means;

said delaying means includes a resistor-capacitor network having a predetermined time constant, and a transistor having an input electrode coupled to said resistor-capacitor network, and an output electrode coupled to said relay circuitry to energize said relay circuitry to couple said memory means to said peak-detecting means after a predetermined delay after said lens capping means is caused to assume said second condition of operation.

4. An automatically adjustable light transmission system comprising:

light detecting means for producing an electrical signal representative of light from an illuminated scene;

light inhibiting means selectively operable from a first to a second condition to respectively permit and inhibit light from an illuminated scene from reaching said light detecting means;

an adjustable light transmission means disposed in the optical path to said light detecting means for adjusting the intensity of said scene illumination at said detecting means;

means including a signal storage device coupled between said light detecting means and said adjustable light transmission means to adjust said light transmission means in response to said electrical signal representative of light from an illuminated scene; and means for decoupling said light detecting means from said signal storage device when said selectively operable means inhibits light from said illuminated scene from reaching said light detecting means.

5. An automatically adjustable light transmission means according to claim 4, wherein:

said means for decoupling said light detecting means further includes delay means for delaying coupling of said light detecting means to said signal storage device for a predetermined interval after said light inhibiting means is selectively operated to permit light to reach said detecting means.

6. An automatically adjustable light transmission means according to claim 5, wherein:

said delay means comprises a source of voltage coupled to a resistance-capacitance circuit for controlling said predetermined interval.

7. An automatically adjustable light transmission means according to claim 6, wherein:

said delay means additionally includes a relay having an energizing coil and contacts;

a transistor having an input electrode coupled to said resistor-capacitor charging network and an output electrode coupled to said energizing coil of said relay, said resistor-capacitor charging network being connected to begin charging when said light inhibiting means is operated to permit light from a scene to reach said light detecting means, said transistor being rendered conductive after said resistor-capacitor charging network charges to a predetermined level to thereby cause said relay to activate said contacts wherein said contacts operate to couple said memory means to said light detecting means.

8. An automatically adjustable light transmission means according to claim 4, wherein:

said means for decoupling includes relay contacts coupled to said signal storage device, said contacts being operated to decouple said light detecting means from said signal storage device in response to said light inhibiting means being selectively operated for inhibiting light.

* * * * *

UNITED STATES PATENT OFFICE

CERTIFICATE OF CORRECTION

Patent No. 3,767,853 Dated October 23, 1973

Inventor(s) Sidney Leo Bendell et al.

It is certified that error appears in the above-identified patent and that said Letters Patent are hereby corrected as shown below:

On the title page, insert -- [73] Assignee: RCA Corporation, a corporation of Delaware --. Column 1, line 30, after "pickup device" insert -- thereby preventing light from reaching this pickup device --.

Signed and sealed this 25th day of June 1974.

(SEAL)
Attest:

EDWARD M.FLETCHER,JR.
Attesting Officer

C. MARSHALL DANN
Commissioner of Patents